Feb. 18, 1930.  M. SCHEY  1,747,325
RANGE
Filed April 26, 1927  3 Sheets-Sheet 3

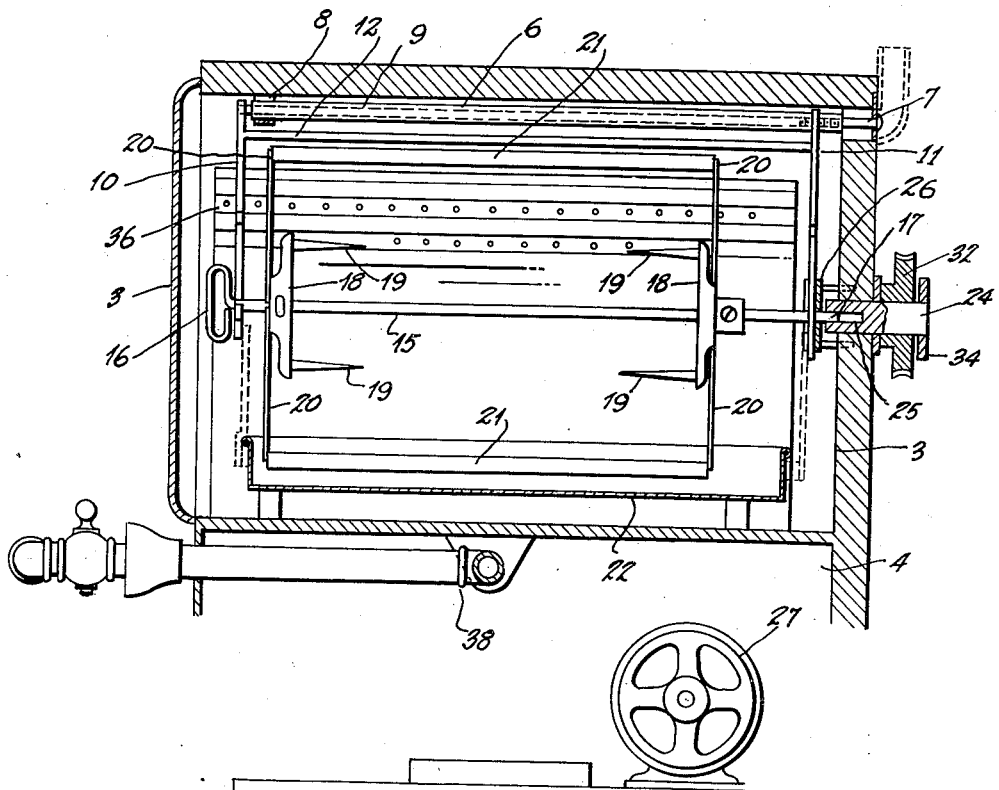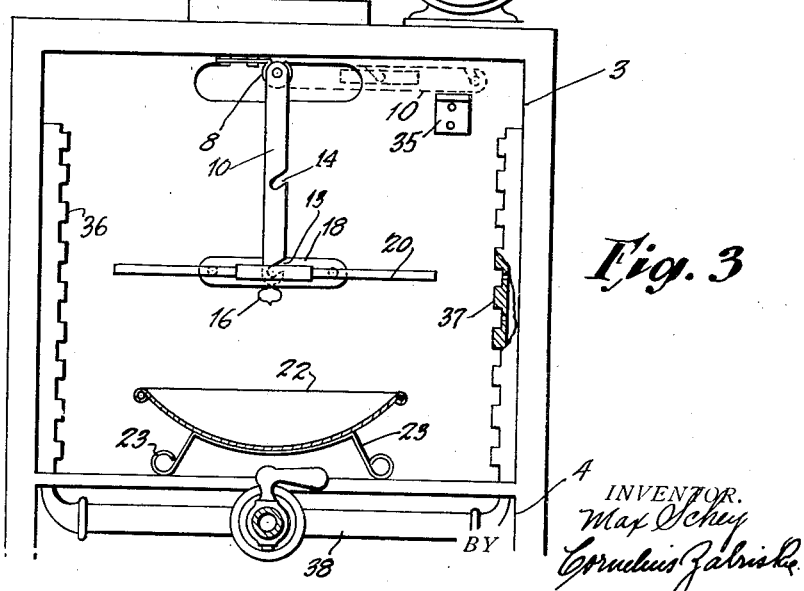

INVENTOR.
Max Schey
BY Cornelius Zabriskie
ATTORNEYS.

Patented Feb. 18, 1930

1,747,325

UNITED STATES PATENT OFFICE

MAX SCHEY, OF BROOKLYN, NEW YORK

RANGE

Application filed April 26, 1927. Serial No. 186,752.

This invention relates to ranges, and, more particularly, to the oven arrangements thereof.

It has long been the practice for housewives, chefs, etc., to cook meats, fish, poultry, etc., in an oven range by depositing such articles in a roasting pan generally with sufficient water for basting and gravy, and thereafter placing the pan in the oven. From time to time the oven door is opened and the roast is basted by a suitable manually operable ladle or spoon and, in some cases, the roasts are turned over in order that the under side may be browned.

This method of cooking meats, poultry, fish, etc., in the oven of a range appears to me to be fundamentally wrong in principle. When meats, poultry or the like are subjected to a roasting operation, while resting in a pan, either one of two detrimental results occurs. In cooking some articles, it is found that the juices, grease, etc. are cooked out of the roast and flow downwardly into the pan to form therein a pool of grease. This operation divests the roast of palatable and nutritious juices and detracts not only from its flavor but from its food value. Furthermore, when some articles are roasted in a pan, the accumulation of grease in the pan incident to the roasting operation causes the roast to be partially submerged in a pool of grease, which in the case of some roasts render the roasts unpalatable and indigestible.

As a result of numerous experiments conducted in connection with the cooking of meats, poultry, fish, etc., I am convinced that for the best results, they should be cooked on all sides simultaneously and should be subjected to a substantially uniform temperature throughout while maintained in a position wherein they will not rest in a pool of grease, but may be subjected to occasional or periodical basting operation as circumstances may require.

As a result of this experimentation, I have found that unusually satisfactory results can be obtained by positioning within the oven of a range a substantially horizontal spit which may be rotated at a relatively slow speed by a motor or any other suitable prime mover. If a chicken, for example, is supported on the spit and slowly rotated therewith, while the oven is at a baking temperature, I have found that the pores at the exterior of the roast quickly become sealed by the heat so as to keep within the roast all of the natural juices thereof with the result that they are not exuded and lost. During the cooking of a chicken in the manner described, any juices which come to the surface and which would drip off, if the roast were stationary, are, by virtue of the rotation of the spit, caused to be distributed about the roast and thus serve an efficient basting function. I may, if so desired, associate with the spit automatic basting means or may manually baste the roast from time to time.

The present invention may thus be generally stated to embody an oven arrangement wherein is positioned a horizontal rotatable spit provided with suitable means whereby it may be rotated. The oven may be of substantially conventional form heated externally or, if desired, it may be provided with a source of heat directly within its confines, so as to subject the roasts to direct radiant heat instead of transmitted heat only. The device of this invention may thus function in a baking operation or in a broiling operation and either with or without automatic basting.

In the preferred embodiment of the invention, a spit is mounted within the oven in such manner that it may be drawn forwardly into exposed position to facilitate the placing of roasts thereon and to be thereafter returned into the oven and the oven door closed to permit of the broiling or roasting operation within a substantially closed chamber.

In the roasting of some articles there is bound to be some dripping of grease and for this reason I may associate with the construction a suitable drip pan. It is also within the purview of this invention to so mount the drip pan with respect to the spit that when the spit is withdrawn from the oven the drip pan is simultaneously moved therewith, so that in the event of dripping of grease, while the roast is in its forward position, such grease will be received in the pan.

The prime mover for the spit may conveniently partake of the form of an electric motor operatively connected in any suitable manner to a rotating element associated with the oven and with which element the spit is adapted for detachable connection, so that the spit may be removed from time to time for cleaning or otherwise. I wish it understood, however, that I do not limit the invention to the employment of an electric motor as any suitable prime mover may be used.

The invention is adapted for use on ranges broadly and may be associated with electric, gas, coal, wood or oil ranges.

The spit may be mounted within the oven on any suitable supporting means to provide for the rotation of such a spit on a substantially horizontal axis and, in practice, the means by which the spit is supported is preferably so constituted that if it is desired to carry out in the oven a baking operation wherein the spit might not be employed, the spit with its supporting means may be shifted into a compacted position leaving the interior of the oven substantially unencumbered thereby. This is an important practical feature of the invention as it permits the oven to be used in the usual way and without interference by the spit or its supporting means.

In the preferred form of the invention, which is particularly adapted for domestic use, a single spit will be found to be entirely satisfactory although it is within the purview of this invention to mount within the oven a plurality of spits suitably spaced apart to permit of their individual or collective operation.

The present invention may be built into the stove during the initial manufacture thereof, but is equally susceptible for use as an attachment in conventional stoves now in use. The structure is such that it may be readily introduced into practically any range oven and secured in place therein by the employment of a few bolts. The driving arrangements for the spit may be attached in any appropriate manner as by bolts or otherwise depending upon the particular type of drive employed.

Features of the invention, other than those specified, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 2 is a section on the line 2—2 of Figure 1.

Figure 3 is a view looking into the oven with the front door open.

The present invention may be associated with ranges which employ coal, electricity, oil, gas or any other suitable fuel, but, for the purpose of illustration, I have shown the same as incorporated in a gas range.

Figure 1:
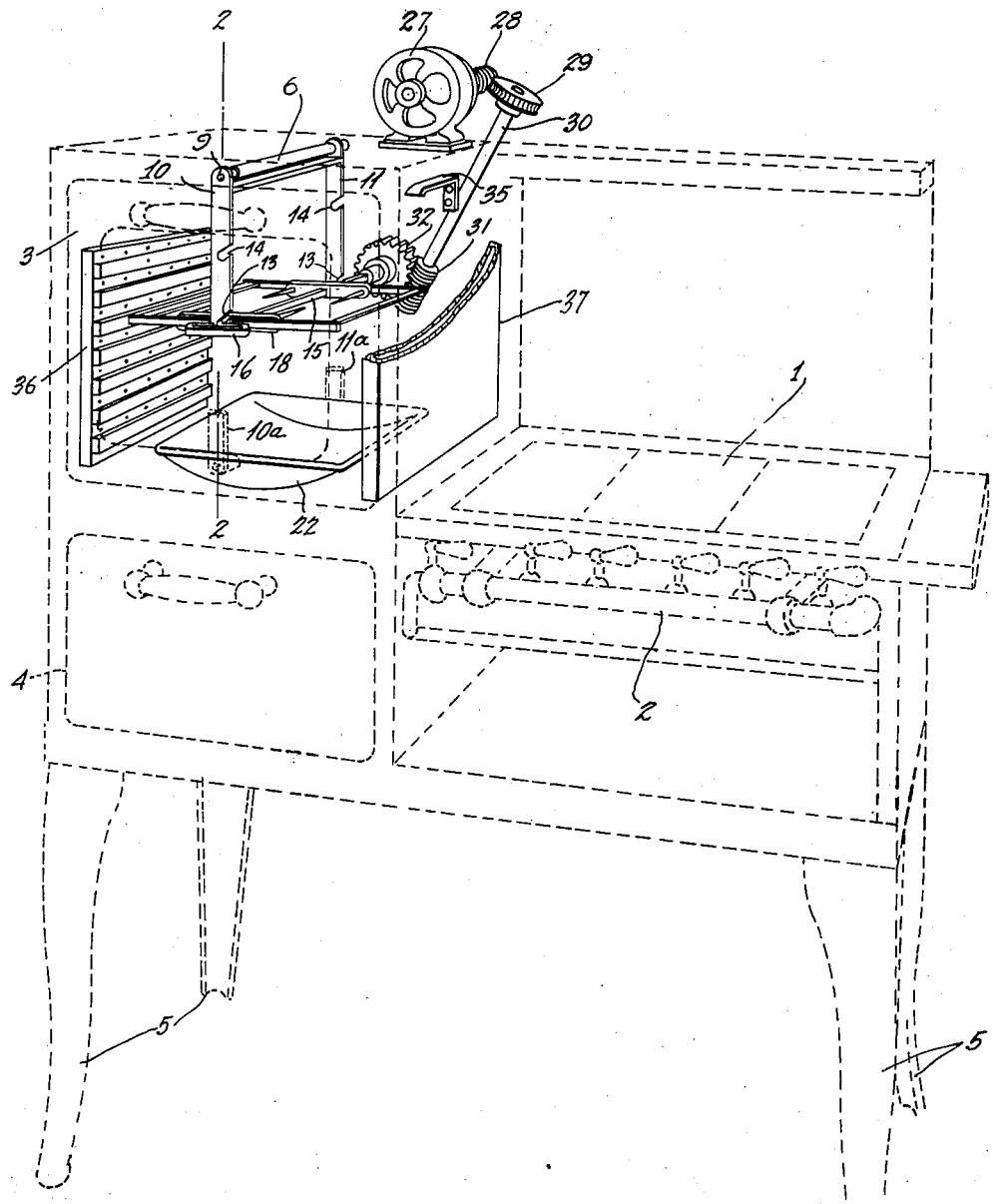
Figure 1 is a perspective view showing a range embodying the present invention and portions of which are broken away in the interest of clearness.

Thus, in Figure 1, the stove is provided with the usual heating plates 1 fed from a heater 2. These plates occupy substantially one half of the width of the stove, while the other half of said width embodies the baking or roasting oven 3 and the so called broiling oven 4. The frame of the stove is conventional and is supported upon suitable legs 5. I make no particular claim to the stove structure per se as the present invention may be associated with any conventional stove. The showing of a conventional stove in the drawing is however essential in order that the invention may be fully understood.

In the embodiment of the invention shown, a tube 6 is mounted in the top of the oven 3 so as to extend from front to rear thereof about midway the width of the oven. This tube may be mounted in any suitable manner, but can be conveniently held in place by passing a screw 7 through the back of the oven to thread into the end of the tube 6 as shown in Figure 2 while the forward end of the tube is supported by brackets 8, as shown in Figures 2 and 3.

The front end of the tube is open and into this tube is adapted to project a rod 9, the tube serving as a guide and support for the rod. To the forward end of the rod is secured a hanger 10, and a hanger 11 is perforated to receive a tube 6 and to slide longitudinally thereof. The hangers 10 and 11 are connected by a spacer or tie member 12 which renders said hangers rigid with respect to one another. In practice, it is found convenient to cast the hangers and spacer 12 in one piece as this gives a strong rigid construction.

The hangers shown in Figures 1 to 3 are in the form of depending straps provided adjacent their lower ends with inclined slots 13 and about midway of their length with similar slots 14. In the lowermost slots, a spit is adapted to be supported. This spit may be of any suitable conventional form with or without basting adjuncts. For the purpose of illustration, the spit is shown as provided with an axial rod 15, the forward end of which has a handle 16 and the after end of which is squared or polygonal as shown at 17. The rod 15 carries relatively adjustable flanges 18 on which are mounted sharp prongs 19 adapted to impale roasts. The spit is also shown as provided with radial arms 20 carrying at their outer ends basting fins 21 which fins are longitudinally channelled and are adapted, when the spit is rotated, to dip grease from a drip pan 22 and to discharge such grease over the roasts impaled on the spit. The drip pan 22 is shown as resting on the bottom of the oven 3 on suitable legs 23.

I wish it clearly understood that I do not restrict this invention to the particular type of spit shown in the drawings. Any conventional form of spit may be employed, but I preferably use either the spit shown in the drawings or one of the spits shown in my Patent Nos. 1,359,749, November 23, 1920; 1,487,481, March 18, 1924; and 1,568,535, January 5, 1926.

It will be noted from the drawings that when the spit is supported from the hanger as described it is mounted on a substantially horizontal axis and in accordance with this invention means is provided whereby the spit may be rotated on this axis. This means may be of any convenient or suitable form, but should be so constituted as to permit the spit to be withdrawn or taken out of the oven so that it may be thoroughly cleaned or to allow roasts to be positioned on or removed from the spit. I find it convenient to mount in the back wall of the oven a stub shaft 24. The inner end of the stub shaft is provided with a polygonal socket 25 adapted to receive the correspondingly shaped end of the spit rod 15, so that as the spit is moved into the oven, the end of the rod will engage or enter the socket so as to lock said rod against relative rotation with respect to the socket. Thus, if the stub shaft is rotated, the spit will also be rotated. The movement of the spit in and out of the oven is of course permitted by the mounting of the hangers on the tube 6 as described and this mounting obviously provides for the forward and back sliding movement of the hangers with respect to the tube.

When the spit is pulled forwardly, the rear hanger 11 slides on the exterior of the tube 6 while the forward hanger 10 moves forwardly with the rod 9 which slides interiorly of said tube. Upon such forward movement, the spit is disengaged from the socket but when the spit is moved rearwardly it is reengaged with the socket. In order to ensure this engagement, a guide 26 may be mounted on the back of the oven and may be formed with diverging sides so that as the spit is moved rearwardly the hanger 11 will engage with said guide and centralize the rod 15 with respect to the socket.

Figure 4:
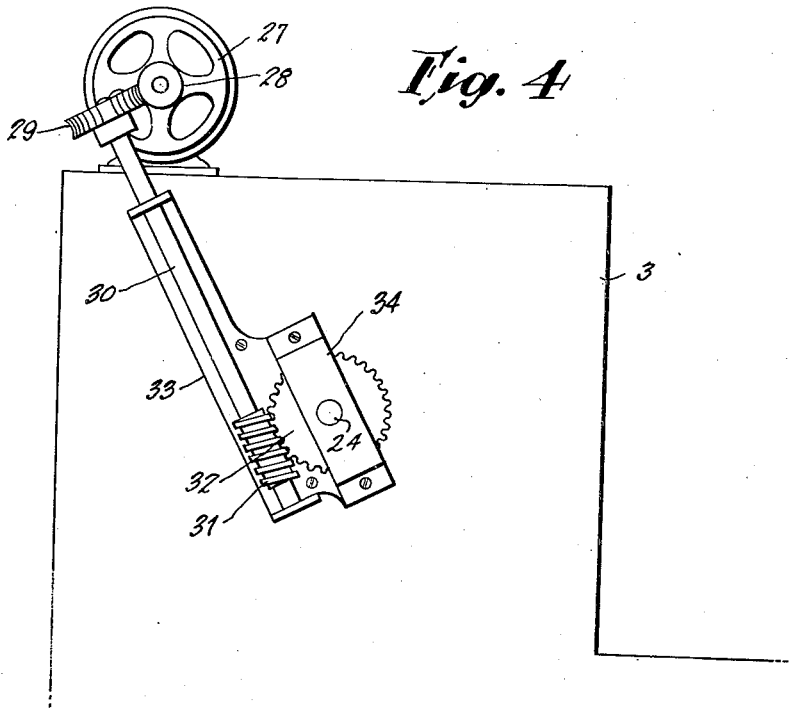
Figure 4 is an elevation of the back of the oven showing the drive mechanism for the spit.

The stub shaft 24 may be rotated in any suitable manner as by a handle either directly connected or secured thereto by suitable operative connections. It is preferable, however, in practice, to have the spit mechanically driven and illustrative means for accomplishing this is shown in Figures 1 to 4. Here electrically operated means is shown as embodying an electric motor 27 mounted on top of the oven. A worm 28 carried by the armature shaft meshes with the worm wheel 29 carried on a counter shaft 30 mounted in suitable bearings in the back of the oven. The lower end of the counter shaft carries a worm 31 which meshes with the worm wheel 32 fixed on the stub shaft 24. The driving connections are best shown in Figure 4, wherein it will be noted that suitable bearings 33 and 34 are provided for the working parts. In practice, a sheet metal housing is provided to enclose these working parts, and suitable thrust bearings are embodied in the construction. These, however, are details of construction which I have not considered it necessary to show.

The motor is illustrated as positioned on top of the oven, but it may be mounted in any other suitable position. Moreover, instead of employing an electric motor, I may employ a spring motor or a water motor without departing from this invention and the drive may be a chain drive or a train of gears. The invention is not restricted to these details of construction. Suffice it to say, that the spit is driven by any suitable means.

I have referred to the drip pan as resting on the bottom of the oven and entirely independent of the spit supports. It is within the purview of this invention, however, to form upon the hangers 10 and 11 downward extensions 10ª and 11ª preferably pivotally associated with the hangers and adapted to engage with the drip pan to support the drip pan below the hangers so that when the hangers are drawn forwardly the drip pan is moved therewith in order that the drip pan may at all times be positioned below the roasts to preclude dripping of grease on the floor.

It is desirable in a device of the character described to so arrange the parts that when the spit is not in use, said spit and its supporting hangers may be moved into a position to render the interior of the oven substantially unencumbered thereby. It is for this reason that the slots 14 are provided in the hangers. When the spit is not in use, it is drawn forward to disengage from the socket of the stub shaft and is then lifted out of the slots 13 and positioned in the slots 14. The hangers are then swung into a substantially horizontal position as shown in dotted lines in Figure 3 and the hangers are thereupon slid backwardly to engage with a retainer 35 positioned on the interior and at the back of the oven as shown best in Figures 1 and 3. When thus positioned, the spit and its supports will be out of the way at the top of the oven and cakes, pies and other culinary articles can be positioned in the oven in the usual manner.

In the accompanying drawings, the spit is shown as mounted in the baking oven 3, but in practice, it may if desired be mounted in the broiling oven 4 without departing from this invention. It is also within the purview of this invention to mount within the baking oven auxiliary heating elements 36 and 37 positioned at the opposite sides of the oven and fed from a header 38, as shown in Figure 3. Thus, the baking oven 3 may be converted into a broiling oven in a simple and expeditious manner. I wish it understood, however, that the invention is not limited to the utilization of the auxiliary heating elements 36 and 37 as a roast supported on the spit may be roasted by indirect heat in a stove of the conventional type by simply associating the spit and its supporting and operating devices therewith. However, when the heating elements 36 and 37 are employed, they are preferably shaped as shown in Figures 1 and 3, so that when the oven is used as a baking oven with the spit arrangement in collapsed position, these heating elements may serve to support racks such as are commonly used in ovens to elevate cake and pastry from the base of the oven.

Figures 5, 6, 7:
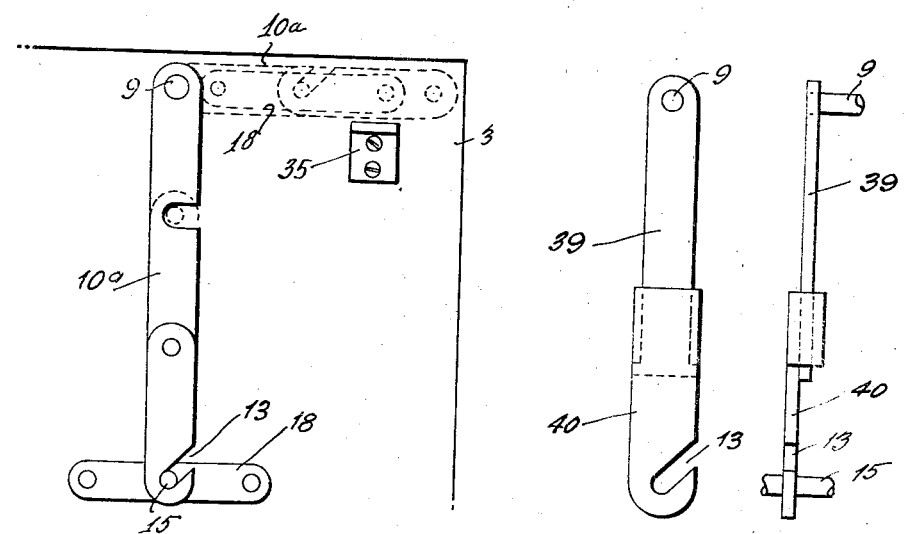
Figure 5 is a fragmental view of the oven showing modified means for supporting the spit.
Figure 6 shows a further modified form of means for supporting the spit.
Figure 7 is an edge view of the structure shown in Figure 6.

Figures 5, 6 and 7 show modified forms of spit support. In Figure 5, the hanger 10ª is shown as formed from two links and both the front and back hangers may be so constructed so that in small ovens these hangers may be folded as shown in dotted lines to allow of movement of the spit into an out of the way position.

In Figures 6 and 7 the hangers are also made in two sections 39 and 40 which are adapted for relative longitudinal sliding movement to permit them to be foreshortened in length when the spit is to be moved into the out of the way position. This arrangement is also for small ovens.

The structure, as thus far described, deals with the movement of a single spit supported in an oven but if desired a plurality of spits may be mounted within the oven without departing from this invention.

It will be apparent from the foregoing detailed description that the invention is simple in construction and that by virtue of its simplicity it may be readily associated with a range of conventional character. In practice, I have found that the parts may be attached to ordinary kitchen ranges in a simple and expeditious manner and will function perfectly in this environment. The employment of the auxiliary heating elements 36 and 37 is intended particularly in connection with stoves wherein the invention is incorporated during the process of manufacture and in such stoves it will be found desirable to provide the front door or some other part of the oven with a rotary or slide valve opening to allow the entrance of secondary air to support combustion.

The invention may be associated as stated either with the baking oven or the broiling oven of a range as may be desired and without substantial change in the range construction.

I have disclosed the invention in its preferred practical form, but the invention is to be understood as fully commensurate with the appended claims.

Having thus fully described the invention, what I claim as new and desire to secure by Letters Patent is:

1. In an assembly of the character described, an oven, spit supporting means positioned within the oven and mounted for movement into and out of the oven, a spit carried by the spit supporting means for rotation thereon, and spit rotating means associated with the oven and adapted to be engaged by the spit when the spit supporting means is moved into the oven.

2. In an essembly of the character described, an oven, a spit supporting guide mounted within the oven, a spit support slidably associated with the guide to be moved thereon into and out of the oven, a spit rotatably carried by the spit support, a rotary element carried by the oven to be engaged by the spit when the spit is moved into the oven.

3. In an assembly of the character described, a stub shaft mounted in the back of an oven and provided on its inner end with a polygonal socket, means positioned exteriorly of the oven for rotating the stub shaft, a spit one end of which is shaped to extend into the polygonal socket of the stub shaft, and means within the oven for supporting the spit for rotation on a substantially horizontal axis while the spit is in driven engagement with the stub shaft.

4. In an assembly of the character described, a stub shaft mounted in the back of an oven and provided on its inner end with a polygonal socket, means positioned exteriorly of the oven for rotating the stub shaft, a spit one end of which is shaped to extend into the polygonal socket of the stub shaft, means within the oven for supporting the spit for rotation on a substantially horizontal axis while the spit is in driven engagement with the stub shaft, a drip pan positioned within the oven, and basting means carried by the spit and adapted to dip grease from the drip pan and discharge it upon roasts supported by the spit.

5. In an assembly of the character described, an oven, a spit, spit supporting means positioned within the oven and normally extending into a roasting position to support the spit for rotation in the oven, said supporting means being movable into a position adjacent one of the walls of the oven to leave the interior of the oven substantially unencumbered, and means for rotating the spit when in roasting position.

6. In an assembly of the character described, an oven provided with a door, a spit, and means positioned rearwardly of the door of the oven for rotating said spit, means, within the oven, for supporting the spit for rotation on a horizontal axis in the oven and serving to permit movement of the spit into and out of the oven through the door opening thereof and into and out of driven relation with the driving means, while said spit remains supported on the oven.

7. In an assembly of the character described, an oven having an open front provided with a door, a spit, means for driving the spit, means for supporting the spit on the oven for rotation on a horizontal axis and for movement into and out of the open front of the oven and into and out of driven relation with the driving means, while the spit remains supported on the oven.

8. In an assembly of the character described, an oven having an open front provided with a door to close the same, a spit, a spit driving element supported for rotation on the oven, said spit and driven element being adapted to detachably interfit with one another, means for supporting the spit on the oven for rotation on a horizontal axis and for movement into and out of the oven and into and out of driven relation with the driving element, and means for guiding the spit into driven relation with the driving element when the spit is moved into the oven.

9. In an assembly of the character described, an oven having an open front provided with a door to close the same, and formed with top, bottom, back and side walls, a spit, a spit driving element extending into the confines of the oven through one wall thereof, said spit and driving element being adapted to detachably interfit with one another, means for supporting the spit on the oven for rotation on a horizontal axis and for movement into and out of the oven and into and out of driven relation with the driving element.

10. In an assembly of the character described, an oven having an open front provided with a door to close the same, and formed with top, bottom, back and side walls, a spit, a spit driving element extending into the confines of the oven through one wall thereof, said spit and driving element being adapted to detachably interfit with one another, and means for supporting the spit in alined engagement with the driving element.

11. In an assembly of the character described, an oven, a spit, spit supporting means positioned within the oven and normally extending into a roasting position to support the spit for rotation in the oven, said supporting means and spit being movable into a position adjacent one of the walls of the oven to leave the interior of the oven substantially unencumbered, and means for rotating the spit when in roasting position, means to lock the support in out of the way position.

12. An oven provided therein with a spit, means for supporting the spit on the oven for rotation and for movement into and out of the oven, while supported thereon, a drip pan positioned beneath the spit and movable into and out of the oven therewith.

13. In an assembly of the character described, an oven provided with a spit supporting guide, a hanger supported to slide into and out of the oven on said guide, and a spit rotatably supported on said hanger, said guide and hanger being mounted to permit the hanger and spit to be bodily moved into proximity with one of the walls of the oven to leave the confines of the oven substantially unencumbered.

14. In an assembly of the character described, an oven provided with a spit supporting guide, a hanger supported to slide into and out of the oven on said guide, and a spit rotatably supported on said hanger, in combination with rotatable driving means carried by the oven to detachably engage the spit to rotate the latter.

15. In an assembly of the character described, an oven having a door and one wall of which oven is provided with a perforation, spit rotating mechanism separate from the spit and mounted on the exterior of the oven in juxtaposition with said perforation, and a spit positioned within and supported on the oven, rearwardly of the door thereof, with one end of the spit extending into driven relation to the spit rotating mechanism to leave the perforation in the wall of the oven substantially sealed, and the other end of the spit terminating within the confines of the oven, said spit being insertable into and removable from the oven and into and out of cooperation with the spit rotating mechanism while meat is positioned on the spit.

16. In an assembly of the character described, an oven having an open front and a door for normally closing the same, spit rotating means separate from the spit and extending into the confines of the oven through one wall thereof and formed interiorly of the oven for detachable engagement with one end of a spit, and a spit supported on and positioned wholly within the oven, leaving the oven substantially sealed when the door is closed, said spit being insertable into and removable from the oven and into and out of cooperation with the spit rotating means while meat is mounted on the spit.

17. An oven having an open front with a door for closing the same, spit driving mechanism mounted at the back of the oven and shaped to interfit with a spit, a spit positioned within and supported on the oven with its rear end interfitting with the driving mechanism, said spit extending forwardly therefrom toward and terminating short of the door and free from engagement with the door to leave the door unencumbered and free for its normal movement without interfering with the operation of the spit.

18. In an assembly of the character described, an oven having a doorway, spit driving means mounted adjacent one wall of the oven and shaped to interfit with a spit, a spit positioned within and supported upon the oven for rotation on a horizontal axis with one end of the spit interfitting with the driving means to be rotated thereby, while leaving the oven wall substantially sealed to preclude the passage of air into the oven at this point, said spit being insertable into and removable from the oven and into and out of interfitting relation to the driving means while meat is supported on the spit, and a door permanently mounted on the oven to seal the doorway while the meat is cooking on the spit, said door being movable from open to closed position during continued operation of the spit.

In testimony whereof I have signed the foregoing specification.

MAX SCHEY.